(12) United States Patent
Kimball

(10) Patent No.: US 6,204,609 B1
(45) Date of Patent: Mar. 20, 2001

(54) ENHANCED INVERTER FOR POWERING AN EL LAMP

(75) Inventor: Robert A. Kimball, Gilbert, AZ (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 09/482,675

(22) Filed: Jan. 13, 2000

(51) Int. Cl.$^7$ .................................................. G09G 3/10
(52) U.S. Cl. .................................. 315/169.3; 315/209 R; 315/205; 363/60
(58) Field of Search .......................... 315/169.3, 209 R, 315/223, 226, 205, 283; 363/58, 60, 37, 98

(56) References Cited

U.S. PATENT DOCUMENTS

| | | | |
|---|---|---|---|
| 4,527,096 | * | 7/1985 | Kindlmann ........................ 315/169.3 |
| 5,313,141 | * | 5/1994 | Kimball ............................ 315/169.3 |
| 5,349,269 | * | 9/1994 | Kimball ............................ 315/169.3 |
| 5,418,434 | * | 5/1995 | Kamens et al. .................... 315/169.3 |
| 5,821,701 | * | 10/1998 | Teggatz et al. ...................... 315/307 |
| 6,043,610 | * | 3/2000 | Buell ................................ 315/169.3 |
| 6,091,164 | * | 7/2000 | Buell ..................................... 307/82 |

OTHER PUBLICATIONS

Data Sheet: Sipex SP4425 EL Lamp Driver © 1997 pp. 1–13.

* cited by examiner

Primary Examiner—Haissa Philogene
(74) Attorney, Agent, or Firm—Paul F. Wille

(57) ABSTRACT

A power supply for an EL lamp includes a boost circuit and four semiconductor switches connected as a bridge having an AC diagonal and a DC diagonal having one end grounded. The voltage boost circuit is coupled across the DC diagonal and an electroluminescent lamp is coupled across the AC diagonal of the bridge. The two semiconductor switches coupled to ground are SCRs.

3 Claims, 1 Drawing Sheet

ENHANCED INVERTER FOR POWERING AN EL LAMP

BACKGROUND OF THE INVENTION

This invention relates to a battery operated power supply for an electroluminescent (EL) lamp and, in particular, to an inverter using SCR's as low side switches in an H-bridge.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the EL lamp, with frequencies between 200 hertz and 1000 hertz being preferred. Ionic migration occurs in the phosphor at frequencies below 200 hertz. Above 1000 hertz, the life of the phosphor is inversely proportional to frequency.

The prior art discloses several types of inverters including an inductive boost circuit having an inductor in series with a switching transistor. Current through the inductor causes energy to be stored in a magnetic field around the inductor. When the current is abruptly shut off, the induced magnetic field collapses, producing a pulse of high voltage. The voltage across the inductor is proportional to $L \cdot \delta i / \delta t$. Thus, a low voltage at high current is converted into a high voltage at low current. The voltage on the lamp is pumped up by a series of high voltage pulses from the inverter.

The direct current produced by the inverter must be converted into an alternating current in order to power an EL lamp. U.S. Pat. No. 4,527,096 (Kindlmann) discloses a switching bridge, known as an H-bridge, to alternate the current through the lamp. The bridge changes the polarity of the current through the lamp at a low frequency (200–1000 hertz). In an H-bridge, the current paths through the transistors correspond to the current paths through the diodes in a full wave bridge rectifier. That is, the bridge has an AC diagonal, coupled to an EL lamp, and a DC diagonal, coupled to a boost circuit. The bridge operates like a double pole, double throw switch, as illustrated in FIG. 1 to produce an alternating current through the EL lamp. The transistors coupled to the supply voltage are known as the "high side" switches and the transistors coupled to common are known as the "low side" switches.

The EL lamp market is very cost sensitive and, for inverters, cost is approximately proportional to the size of a semiconductor die. In a bridge circuit, the peak current determines the size (and cost) of the switching transistors. Cost is also a factor of the kind of transistor, of which there are several.

The high side switches of an H-bridge are typically either silicon controlled rectifiers (SCRs) or p-channel metal-oxide-semiconductor, field effect transistors (PMOS FETs). The low side switches of an H-bridge are typically NPN-type bipolar junction transistors or NMOS FETs. An advantage of MOSFETs is negligible gate current. An advantage of an SCR is also negligible gate current. Another advantage of an SCR is that an SCR can be made substantially smaller than MOSFETs of equal current capacity. An SCR is also far less susceptible to failure due to electrostatic discharge and over voltage than a MOSFET.

Some commercially available inverters use NMOS low side switches. Others use NPN bipolar junction transistors as low side switches. Although smaller than FETs of comparable current capability, there are two important drawbacks to bipolar junction transistors, they require significant base current and they must be sized for peak lamp current, causing them to be substantially larger than the equivalent SCR.

In view of the foregoing, it is therefore an object of the invention to provide an improved H-bridge for driving EL lamps.

Another object of the invention is to reduce the cost of low power inverters for EL lamps.

A further object of the invention is to improve the efficiency of low cost inverters for EL lamps.

Another object of the invention is to reduce the current drawn by a battery power inverter for driving an EL lamp.

SUMMARY OF THE INVENTION

The foregoing objects are achieved in the invention in which a power supply for an EL lamp includes a boost circuit and four semiconductor switches connected as a bridge having an AC diagonal and a DC diagonal having one end grounded. The voltage boost circuit is coupled across the DC diagonal and an electroluminescent lamp is coupled across the AC diagonal of the bridge. The two semiconductor switches coupled to ground are SCRs. +

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
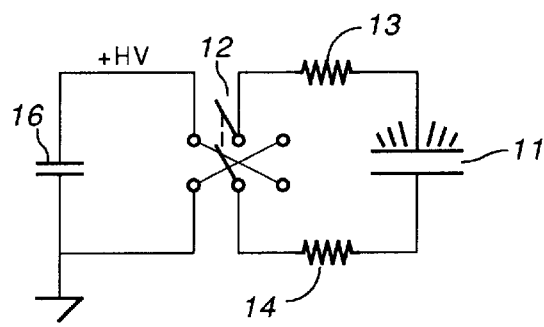
FIG. 1 illustrates the operation of an H-bridge inverter.

As noted above, an electroluminescent lamp requires an alternating current for operation. When a direct current source is all that is available, alternately reversing the connections of an EL lamp and a source of direct current will provide an alternating current. As illustrated in FIG. 1, the terminals of EL lamp 11 are coupled to respective poles of double pole, double throw (DPDT) switch 12 through resistors 13 and 14. The throws of switch 12 are connected to capacitor 16, which stores high voltage DC from a suitable source, not shown. When switch 12 is closed to the left, current flows from the upper electrode of lamp 11 to the lower electrode and flows in the opposite direction when the switch is closed to the right.

Figure 2:
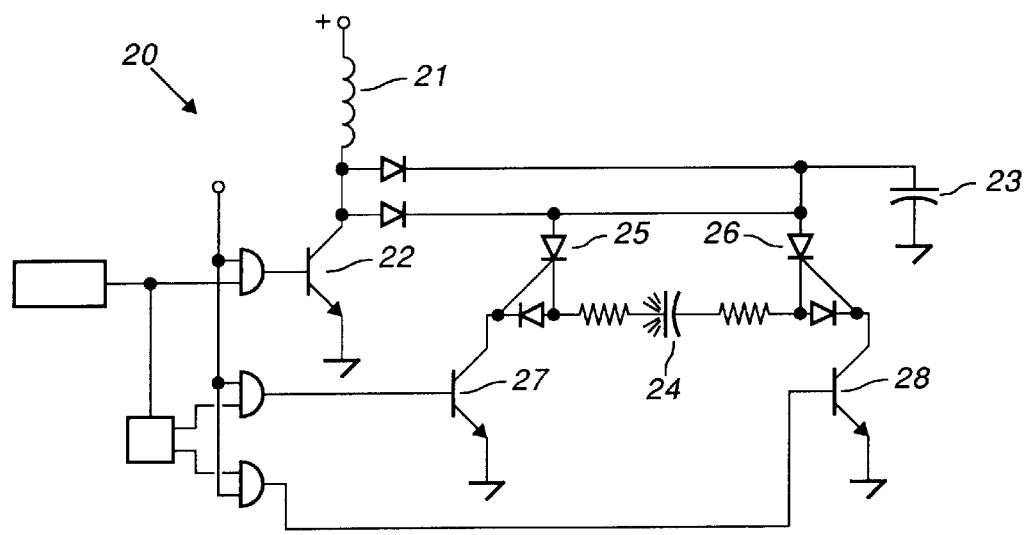
FIG. 2 is a schematic of a commercially available inverter having an H-bridge output.

FIG. 2 is a schematic of a commercially available inverter that includes the electronic analog of a DPDT switch.

Inverter 20 includes inductor 21 and switching transistor 22 operating in a well known boost configuration to charge capacitor 23 to a high voltage. EL lamp 24 is connected to the AC diagonal of a bridge including SCR 25, SCR 26, switching transistor 27, and switching transistor 28. Capacitor 23 is connected across the DC diagonal of the bridge. SCR 25 and transistor 28 conduct simultaneously to pass current in a first direction through EL lamp 24. SCR 26 and transistor 27 conduct simultaneously to pass current in a second direction through EL lamp 24, alternating with SCR 25 and transistor 28.

Any current not contributing to the production of light is wasted and decreases the efficiency of the circuit. For devices operating from a battery, wasted current shortens battery life. The base drive current for transistor 22 is unrecoverable and unavoidable. A field effect transistor could be used instead but the cost of a FET is significantly higher than that of a bipolar transistor.

Figure 3:
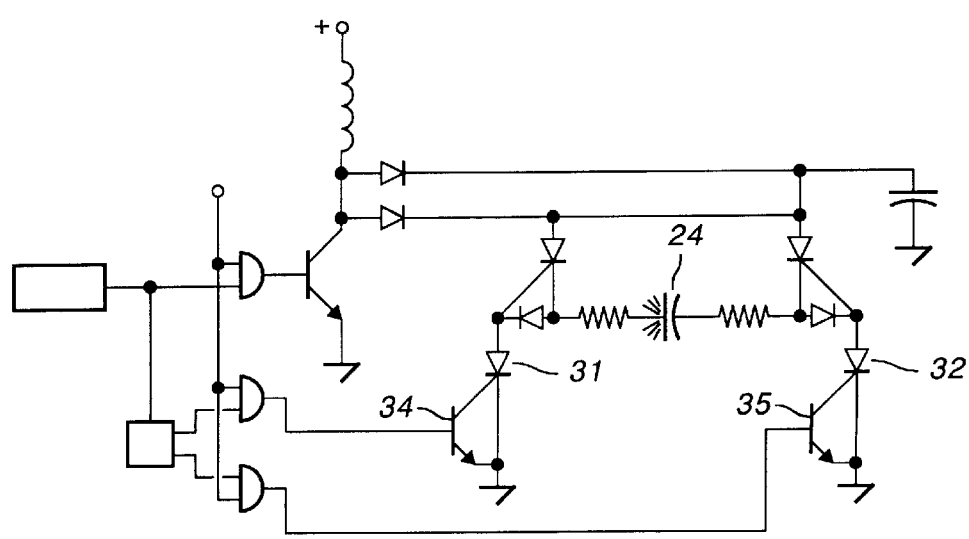
FIG. 3 is a schematic of an inverter constructed in accordance with a preferred embodiment of the invention.

In accordance with the invention, switching transistors 27 and 28 are replaced with SCRs, as illustrated in FIG. 3. SCR 31 and SCR 32 are "low side" switches, coupling the AC diagonal of the bridge to ground or common. Transistor 34 is coupled to the gate of SCR 31 and transistor 35 is coupled to the gate of SCR 32. The base drive currents for transistors 34 and 35 are dramatically lower than (1/50) the base drive currents for transistors 27 and 28 (FIG. 2). Even including the gate control currents of the SCRs, the total drive current for the low side switches is less than in the prior art.

The circuit operates in the manner described above, alternating the current through EL lamp 24. The SCRs and bipolar transistors are easily implemented with current process technology and the devices require less wafer area, further reducing the cost of the circuit.

The invention thus provides an improved H-bridge for driving EL lamps that reduces the cost of low power inverters for EL lamps and increases battery life.

Having thus described the invention, it will be apparent to those of skill in the art that various modifications can be made within the scope of the invention.

What is claimed as the invention is:

1. A power supply for an electroluminescent lamp, said power supply comprising:

a voltage boost circuit;

four semiconductor switches connected as a bridge having an AC diagonal and a DC diagonal, wherein said voltage boost circuit is coupled to said DC diagonal and said AC diagonal is adapted for connection to said electroluminescent lamp;

wherein each semiconductor switch includes an SCR.

2. A power supply for an electroluminescent lamp, said power supply comprising:

a voltage boost circuit;

a first pair of series connected, semiconductor switches including a first high side switch and a first low side switch;

a second pair of series connected, semiconductor switches including a second high side switch and a second low side switch;

wherein said high side switches are coupled to said boost circuit, said low side switches are coupled to ground and wherein each low side switch includes an SCR.

3. The power supply as set forth in claim 2 wherein each low side switch further includes a bipolar transistor driver coupled to the gate of the SCR, wherein the base drive current of the bipolar transistor plus the gate drive current of the SCR is less than the drive current for a bipolar transistor alone as a low side switch.

* * * * *